United States Patent
Keller

(10) Patent No.: US 7,505,834 B1
(45) Date of Patent: Mar. 17, 2009

(54) METHOD FOR EFFECTING THE PREVENTIVE AND/OR CURRENT DISPLAY OF TRANSMISSION COSTS DURING THE TRANSMISSION OF INTERNET AND ONLINE DATA

(75) Inventor: Walter Keller, Ratingen (DE)

(73) Assignee: T-Mobile Deutschland, Bonn (DE)

( * ) Notice: Subject to any disclaimer, the term of this patent is extended or adjusted under 35 U.S.C. 154(b) by 1331 days.

(21) Appl. No.: 10/069,850

(22) PCT Filed: Aug. 30, 2000

(86) PCT No.: PCT/DE00/02969

§ 371 (c)(1),
(2), (4) Date: Apr. 22, 2002

(87) PCT Pub. No.: WO01/17221

PCT Pub. Date: Mar. 8, 2001

(30) Foreign Application Priority Data

Aug. 31, 1999 (DE) ................ 199 41 461

(51) Int. Cl.
*H04M 15/00* (2006.01)
*G06Q 10/00* (2006.01)
*G06Q 40/00* (2006.01)
*G06F 17/00* (2006.01)

(52) U.S. Cl. .............................. 701/1; 705/40; 705/400

(58) Field of Classification Search ...................... 705/1, 705/400, 40
See application file for complete search history.

(56) References Cited

U.S. PATENT DOCUMENTS 5,604,487 A * 2/1997 Frymier ...................... 340/5.9

(Continued)

FOREIGN PATENT DOCUMENTS

WO    WO 98/21676    5/1988

(Continued)

OTHER PUBLICATIONS

Malone, New Directions in Telephone Technology, May 1995, Moder Office Technology, vol. 30, Iss. 5, p. 57.*

(Continued)

*Primary Examiner*—Naresh Vig
(74) *Attorney, Agent, or Firm*—Robert G. Crouch; Marsh Fischmann & Breyfogle LLP

(57) ABSTRACT

The present invention suggests the introduction of an additional protocol element for a preventive display of transmission costs in the case of Internet and on-line services, at least for the transmission of larger quantities of data, such as, for example FTP files, sent by the provider, which can, at least, contain the scope of the data in the pending transmission, as well as other price criteria, optionally, which is recognized as such by the nodes (routers) that are involved in the transmission, and which may be expanded by its own proportional transmission prices, such that, ultimately, in the recipient's PC, on the browser for example, an evaluation of the protocol element, with a display of the costs, accordingly, appears on the screen, after which the subscriber can institute a transmission or disrupt it and optionally, take additional measures, such as, for example, activating the automatic instigation of the transmission at a later, more favorable time from the standpoint of costs.

In particular, the introduction of the protocol element for all pending transmissions of data, including, for example, HTML pages, makes sense as an option that affords protection against the senseless delivery of large numbers of illustrated pages, especially in cases of rapid Internet access.

7 Claims, 2 Drawing Sheets

U.S. PATENT DOCUMENTS 6,047,051 A * 4/2000 Ginzboorg et al. .......... 379/130

FOREIGN PATENT DOCUMENTS

| WO | WO 95/24011 | | 9/1995 |
| WO | WO 97/22936 | | 6/1997 |
| WO | WO 98/02828 | * | 1/1998 |
| WO | WO 99/07108 | | 2/1999 |
| WO | WO 99/08436 | | 2/1999 |

OTHER PUBLICATIONS

Keller, Claim For Foreigh Priority, Aug. 20, 1999.*

"3rd Generation Partnership Project; Technical Specification Group Services and System Aspects Service aspects; Charging and Billing (3G TS 22.105 version 3.1.0)"; 3G TS 22.115 3.1.0 (Apr. 1999); pp. 1-14.

"Integrated Services Digital Network (ISDN); Advice of Charge: charging information during the call (AOC-D) supplementary service Service description"; European Telecommunication Standard Institute; Oct. 1992; pp. 1-17.

"3rd Generation Partnership Project; Technical Specification Group Services and System Aspects Service aspects; Charging and Billing (3G TR 22.924 version 3.1.1)"; 3G TR 22.924 3.1.1 (Apr. 1999); pp. 1-13.

"Reservation-Based Charging in an Integrated Services Network", George Frankhauser, Burkhard Stiller, Christoph Vogtli, Bernhard Plattner, 4th INFORMS Telecommunications Conference, Boca Raton, Florida, U.S.A., Mar. 8-11, 1998, Session MC-2, pp. 1-8.

* cited by examiner

METHOD FOR EFFECTING THE PREVENTIVE AND/OR CURRENT DISPLAY OF TRANSMISSION COSTS DURING THE TRANSMISSION OF INTERNET AND ONLINE DATA

The invention relates to a process for the preventive and/or current display of transmission costs in the case of transmissions of Internet and on-line data from a services/information provider to a subscriber in accordance with the over-arching concept of patent claim 1.

The basic application possibilities for Internet operation, with the pertinent protocol structures, are sufficiently well known. Accordingly, the most common applications consist of looking at (so-called browsing) of Internet pages, which are written in hypertext markup language, HTML, for example, and are loaded into the user's machine, a personal computer, PC, for example, via hypertext transfer protocol, HTTP over the Internet, which is based upon TCP/IP as a transport protocol. This is probably the most common application. The software requirement for Internet operation that is imposed upon the user is the presence of a so-called browser, as a rule.

Next, as an additional point of emphasis, comes the possibility of transferring wide-ranging files of arbitrary content. These files are transferred, for example, by means of a File Transfer Protocol, FTP, in which a frequent application may be found, for example, in the so-called downloading of new software releases for the PC field. Here, very long transmission times can sometimes occur if it is a matter of large amounts of data in combination with slow Internet connections.

Another point of emphasis is the transmission of electronic mail, the so-called E-mails, for example, by means of Simple Mail Transfer Protocol, SMTP, in which case, the matter in hand, preferably, is quite small quantities of data, which can, however, be supplemented by attachments. These attachments, then, are frequently files with text, data, or pictures, though here, once again, large amounts of data can be involved.

The usual method of proceeding, which has been introduced in the Federal Republic of Germany, at least, for Internet access or on-line access, consists of the fact that the subscriber, with his PC, is connected via a telecommunications network, such as the ISDN network, for example. With the latter, he creates a dial-up connection to the appropriate Internet Access Provider (IAP). After that, he avails himself of either the IAP's offerings, which provides, if applicable, services of its own, such as weather forecasts, discussion forums, offers of goods for sale in conjunction with partner firms, etc. (IAP is, simultaneously, the on-line SP or ISP), or he uses the IAP as a transition to the Internet Service Providers, ISP's, who are connected to the Internet worldwide. As a rule, however, this communication occurs only if the subscriber has a contractual relationship with both a telecommunications firm (Telco) as IAP access, as well as an additional contractual relationship with an IAP, which can, according to the example that was cited above, itself, be an ISP.

The structure of the transmission costs is correspondingly complicated. As a rule, it is comprised of monthly basic fees for both providers (Telco and IAP), as well as of connection-specific current costs for the individual session. Additional costs, which are covered by a separate bill, billed to a credit card or, in some cases, such as T-online, for example, covered by the telephone bill by means of special contractual relationships between ISP and provider, accrue for those availing themselves of any ISP services.

The problem associated with proceeding in this manner consists, in particular, of the fact that the subscriber, until such time as the ex post facto monthly telephone bill arrives, has no clue at all as to the costs he has incurred with his Internet access. The only indication he possesses at present is the optional indication of file size, which is displayed in the FTP download procedure by many ISP's. With this information, for example, the customer can calculate his telephone company's transmission costs, as well as his IAP's costs per session himself, before demanding the data as a download.

However, this process is not altogether trivial. First of all, the customer must know his telephone line's data transmission speed and that of his terminal adapter or modem, as well as the protocol overhead of the Internet and application protocols, more or less. Then he calculates the required transmission time and after that, while bearing the individual, complex rate structures in mind, the Telco and IAP costs associated with them. When proceeding in this manner, there is not much cause for joy, particularly since the rate of transmission, for reasons having to do with network or server overload at any arbitrary point in the complete connection, as well as in the case of a bad telephone line with frequent automatic repetitions, can experience additional delays.

If the case of the current networks, which are line-supported, both the Telco and the IAP calculate the duration of the session, in terms of time, regardless of how much data is transferred in this time or regardless of how long the customer who is inclined to do so requires for any calculation of his costs he might undertake.

Volume pricing on the part of the Telco, instead of time-based pricing, would change nothing, in principle, since this stretch represents just a portion of the transmission, and the remote ISP, in the case of its informational offer, which is created for worldwide access, cannot address specific Telco-related concerns of individual subscribers, and thus, presumably for he future as well, it will display only the quantity of data [transferred], and only in the case of an FTP transfer, if at all.

Therefore, an improvement of the situation by means of the introduction of a suitable process is necessary.

It is the underlying task of the present invention to propose a process on the basis of which the Internet or on-line subscriber, prior to any pending transmission of at least large quantities of data, can be supplied with information concerning the transmission costs as a current and/or preventive measure, regardless of the transmission method that is used.

The characteristic features of patent claim 1 meet this task.

The essential characteristic of the invention is that prior to any pending transmission of data, the service/information provider transmits an additional protocol element (the price element), containing an indication of the data volume that is pending, to the subscriber (recipient), such that the protocol element, as such, is acknowledged by the transit nodes that are involved in the transmission and/or by the telecommunications networks, and the protocol element is ultimately evaluated in the recipient's terminal unit, and a read-out of the sum total of pending transmission costs is displayed.

According to the invention, the advantage is achieved by virtue of the fact that the subscriber has, at all times, control over the transmission costs that have been incurred and those that will yet be incurred i.e. the actual total costs that are incurred with transmission.

The protocol element can, to good advantage, contain additional price-relevant criteria from the service/information provider, such as, for example, quality of service, transmission priority, routing instructions, price group, contractual information, security classifications, sender's details, etc.

The evaluation of the cost data contained within the protocol element by the terminal unit is simple. In a preferred application, this can occur by means of particular options in the browser software that is used, which the protocol acknowledges as such, which perform the corresponding calculations and display the result.

An extension of the invention makes provision for the fact that the browser software causes an additional menu (ME), with alternative menu points to be displayed, by virtue of which the subscriber can institute the transmission of the software or, alternatively, reject it. This can be achieved by corresponding information fields in a page of offerings that is transferred by the service or information provider and displayed at the terminal unit. Furthermore, the menu can offer, as options, additional menu points that initialize additional activities at the end unit, such as, for example, creating a later automatic connection to the service provider with the institution of the data transmission in question at a more favorable time, from the perspective of costs.

Another extension provides for the introduction of a particular protocol element, which is transferred to the terminal user's machine prior to any transfer of data at all, thus, for example, a HTML page to the terminal unit, thus rendering it possible for the user to elect whether he would like to receive these data or not. This measure serves, in particular, as a protective mechanism for rapid Internet access on the part of the user, where, for example, a wide range of HTML pages that are expanded with picture elements are sent even before the user can react and disrupt the data transfer in any concerted way.

In this regard, provision is made so that an individual, user-specific limitation on data or costs can be programmed by the user, beneath which the automatic delivery of data occurs, in which the user's terminal unit automatically confirms all transfer requirements.

In an alternative type of embodiment, provision is made so that a data or cost limit that is set by the subscriber is automatically transmitted to the service/information provider, after which the services/information provider, for his part, automatically asks for user confirmation/denial of the pending transfer above this limit.

Furthermore, a particular protocol element can be introduced for all current data transfers, and it can be sent along with every transmission of data, as a result of which, especially in the case of transmission networks that are charged by volume, a clear, current overview of costs is rendered possible.

In what follows, using figures in the drawing that here describe just one possible embodiment type by virtue of the example of an Internet transmission and a personal computer (PC) as a terminal unit, the invention is elucidated, such that by virtue of the drawing figures, additional features, areas of application, and advantages of the invention result.

Figure 1:
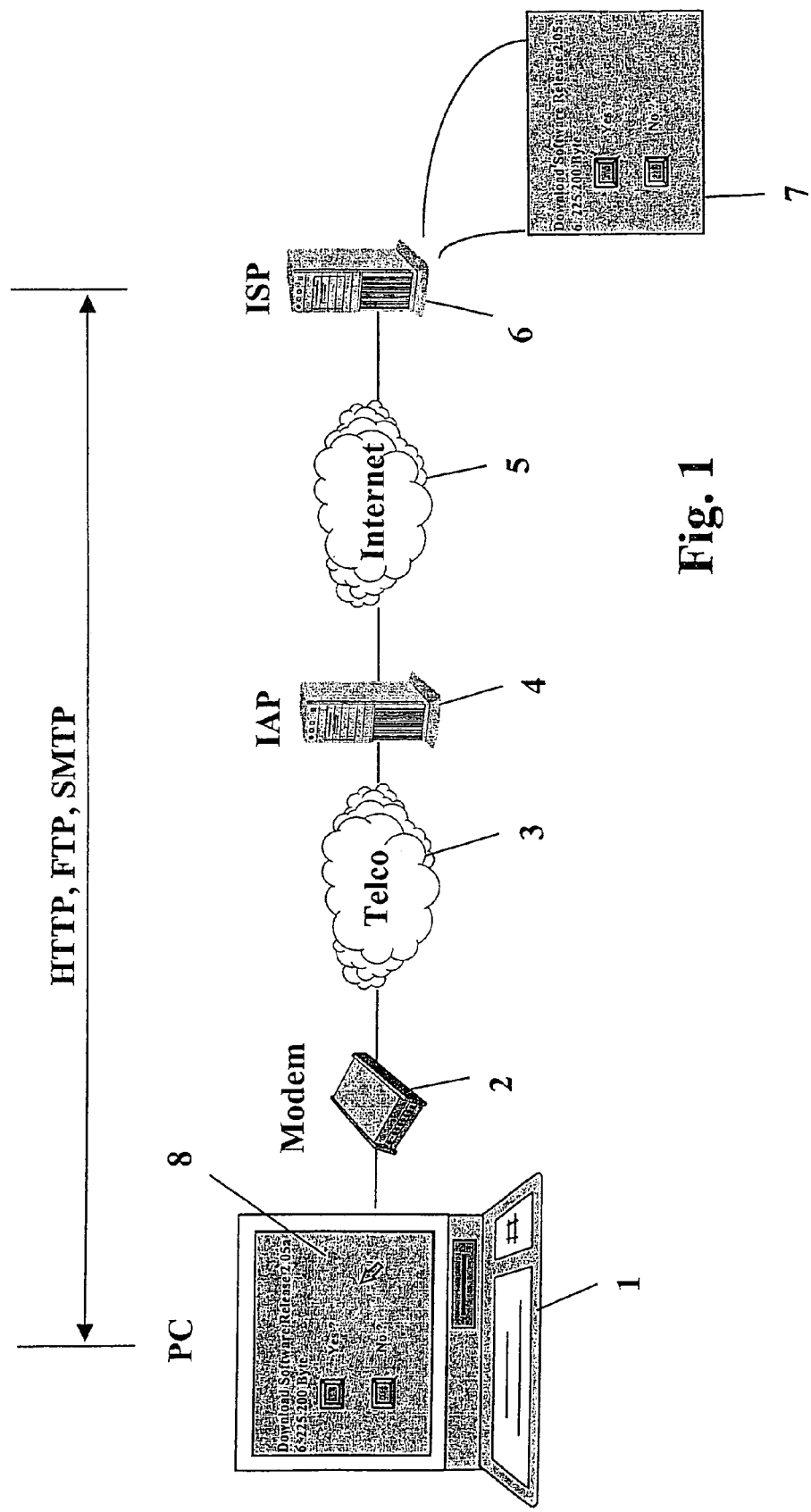
FIG. 1 shows a representation of a typical Internet connection.

FIG. 1 shows, schematically, an Internet connection and the components that are involved in constituting it. A subscriber having, for example, a PC as terminal unit 1 is connected to a telecommunication network 3 by way of a modem 2. The transition to the Internet access provider 4, which creates the connection to the worldwide Internet 5, exists here. In this example, the subscriber communicates with a remote service provider 6 (ISP: Internet Service Provider), who makes a certain offer, an Internet page 7, for example, and transmits it to terminal unit 1 where this page is represented on the display 8. In reality, a service provider 6 often does not make all offers directly, but rather, in a manner comparable to stretch 1-3, creates a connection to so-called host computers of outside firms, which, for their part, use the service provider as an Internet access provider. In the present mode of observation, however, this circumstance is not critical, and, for purposes of simplification, it was not depicted.

The transmission of the contents, here page 7, occurs here by means of an end-to-end protocol, so that the content for the transit provision node (router) cannot be seen.

For that reason, support of a cost display on the part of the network is, in principle, not possible.

Figure 2:
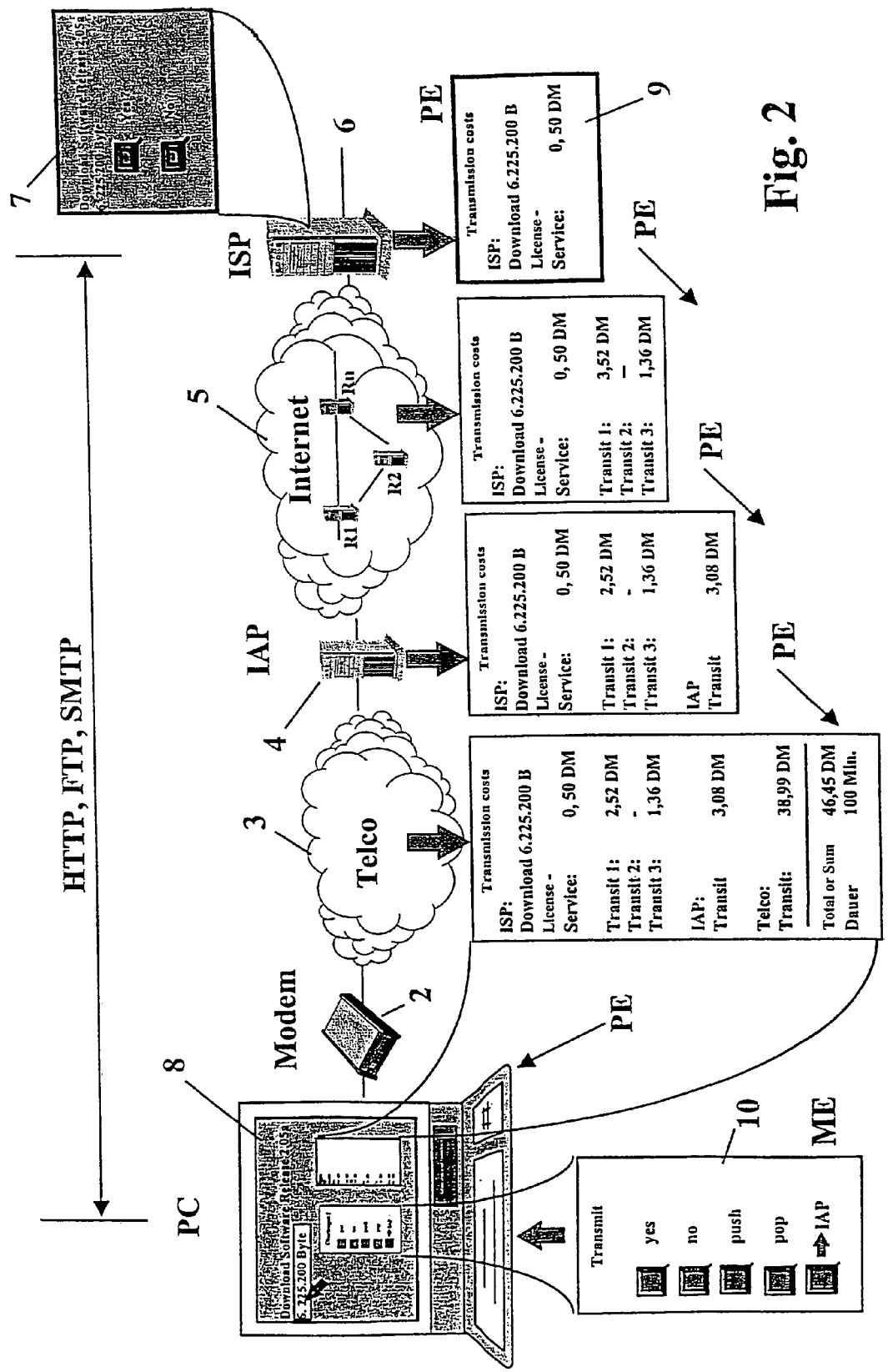
FIG. 2 shows a representation of an Internet connection with an expansion for a preventive cost display according to the invention.

Therefore, the present invention takes another route. According to FIG. 2, an additional protocol element 9, which can recognize the transit nodes that are involved in the transmission (components or network elements) 5, 4, and 3, is sent by the service provider 6 with each offer of transmission. This protocol element 9 contains identifying characteristics pertaining to the data to be transmitted, such as indications regarding the size of the quantity of data to be transmitted, any additional costs that might be incurred, and other characteristics, such as, for example, quality of service, priority of transmission, sender recognition, price categories, routing instructions, etc.

All transit nodes 5, 4 and 3 that are involved in the transmission recognize protocol element 9, and, after the corresponding calculation, they add their own transmission costs, which are incurred to protocol element 9 if necessary, as a result of which, the latter is constantly expanded, and they send protocol element 9 to the next node. In this way, the protocol element collects all relevant constituent costs of the pending transfer on its journey to the subscriber's terminal unit 1. In the subscriber's terminal unit 1, the installed Internet browser recognizes protocol element 9 and brings this to display 8 such that, if needed, a subsequent treatment of the data, such as a summation of the constituent costs, is undertaken for the sake of a better display.

The price information is displayed on the screen of terminal unit 1 by selecting and activating a corresponding field (pull-down or pop-up menu or a separate display window), or, alternatively, displayed directly. The displayed screen page, in the last instance with this method no longer corresponds to the original page 8, but is expanded, rather, in those cases in which the method according to the invention is contained proportionally within terminal unit 1, by the display of the data of protocol element 9.

As an option, additional menu elements 10 (ME) can be displayed, elements that activate different transfer options, such as the induction of a direct transmission, the disruption of the transmission, a subsequent, more cost-effective automatic transfer, for example, in POP operation (terminal unit 1 automatically induces the connection), or, in PUSH operation (service provider 6 automatically induces the connection), or, for example, an interim solution with immediate transmission to service provider 6 with temporary intermediate storage and subsequent transmission via the telecommunications network 3.

Furthermore, the introduction of a standard protocol element for all pending data transmissions, even HTML pages, for example, makes sense as an option which, especially in the case of rapid Internet accesses, such as 2 Mbps connections for instance, affords protection from the senseless delivery of large numbers of illustrated pages, for it is precisely here that high costs are caused by the high transmission band width that is available by virtue of the fact that the user can no longer disrupt a senseless transmission with a great scope of data in a timely manner before it was completed.

An individually programmable transmission limit, imposed by the user, renders the automatic delivery of all quantities of data that lie beneath that limit possible, and, from the prescribed limit onward, it leads to the requisite approval before the data is transmitted.

As an option, the introduction of an additional standard protocol element for all current data transfers makes sense, as a result of which a clear assignment of current costs to all transferred data is assured, especially in the case of volume-based billing within the telecommunications network.

The invention claimed is:

1. A process displaying prior to transmission the transmission costs in the transmission of Internet data or on-line data by a services/information provider to a subscriber, including:
   prior to a pending transfer of data, transferring a protocol element by the services/information provider to the subscriber's terminal unit, wherein the protocol element contains an indication of the pending volume of data;
   recognizing the protocol element at one or more transit nodes of the telecommunications networks that are involved in the transmission;
   supplementing as needed the protocol element by a partial cost based on a transmission through the one or more transit nodes; wherein the supplementing step is performed by the one or more transit nodes;
   evaluating the protocol element at the subscriber's terminal unit to determine the value of a pending transmission;
   displaying the total of pending transmission costs at the subscriber's terminal unit via browser software to the subscriber, said
   browser software displaying a menu enabling the subscriber to institutes the transmission of the data or refuses the transmission of data based on the total of pending transmission costs.

2. A process according to claim 1, wherein the protocol element includes one or more price-relevant criteria selected from a group consisting of: quality of service; priority of transmission routing instructions; price group; contractual comment; degrees of security; and an indication of the sender.

3. A process according to claim 1 wherein evaluating at the subscriber's terminal unit includes calculating the total of pending transmission costs based on the protocol element via calculating means that are configured with the browser software.

4. A process according to claim 1, wherein the menu includes menu points to initiate transfer options at the subscriber's terminal unit wherein said transfer options are selected from a group consisting of: direct transmission; disruption of the transmission; transmission cost options; and data storage.

5. A process according to claim 1, further including indicating with the protocol element prior to data transmission an option of electing to receive the data.

6. A process according to claim 1, further including providing a means for programming to the subscriber, wherein the means for programming provides for automatically confirming transmission demands.

7. A process according to claim 1 further including:
   setting either a data limit or a cost limit at the subscriber's terminal unit;
   automatically transferring the data limit or the cost limit from the subscriber's terminal unit to the service/information provider; and
   automatically transferring a confirmation/denial option of the pending transmission from the service/information provider to the subscriber's terminal unit for all data deliveries above said data or cost limits.

* * * * *

UNITED STATES PATENT AND TRADEMARK OFFICE
CERTIFICATE OF CORRECTION

| | |
|---|---|
| PATENT NO. | : 7,505,834 B1 |
| APPLICATION NO. | : 10/069850 |
| DATED | : March 17, 2009 |
| INVENTOR(S) | : Keller |

It is certified that error appears in the above-identified patent and that said Letters Patent is hereby corrected as shown below:

Column 1, line 50, delete "foruns", and insert therefor --'forums--.

Column 5, line 34, delete "institutes", and insert therefor --institute--; and

Column 5, line 35, delete "refuses", and insert therefor --refuse--.

Signed and Sealed this

Twenty-eighth Day of April, 2009

JOHN DOLL
*Acting Director of the United States Patent and Trademark Office*